(12) United States Patent
Hirose

(10) Patent No.: US 8,561,141 B2
(45) Date of Patent: Oct. 15, 2013

(54) INFORMATION INPUT ASSISTANCE DEVICE, COMPUTER-READABLE MEDIUM, AND INFORMATION INPUT ASSISTANCE METHOD

(75) Inventor: Akira Hirose, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 318 days.

(21) Appl. No.: 12/858,939

(22) Filed: Aug. 18, 2010

(65) Prior Publication Data

US 2011/0225628 A1    Sep. 15, 2011

(30) Foreign Application Priority Data

Mar. 11, 2010   (JP) ................................ 2010-054467

(51) Int. Cl.
*G06F 21/00*    (2013.01)

(52) U.S. Cl.
USPC .......................................................... 726/3

(58) Field of Classification Search
USPC .......................................................... 726/3
See application file for complete search history.

(56) References Cited

U.S. PATENT DOCUMENTS

| | | | |
|---|---|---|---|
| 6,629,246 B1 | 9/2003 | Gadi | |
| 2005/0027990 A1* | 2/2005 | Ogawa | ........................ 713/184 |
| 2008/0074693 A1* | 3/2008 | Hashimoto et al. | .......... 358/1.15 |
| 2009/0125972 A1* | 5/2009 | Hinton et al. | ..................... 726/1 |
| 2009/0271632 A1* | 10/2009 | Matsuo | ........................ 713/184 |

FOREIGN PATENT DOCUMENTS

| | | |
|---|---|---|
| JP | 2000-207362 A | 7/2000 |
| JP | 2000-347994 A | 12/2000 |
| JP | 2002-032341 A | 1/2002 |
| JP | 2002-324051 A | 11/2002 |
| JP | 2008-083809 A | 4/2008 |

* cited by examiner

*Primary Examiner* — Michael S McNally
(74) *Attorney, Agent, or Firm* — Sughrue Mion, PLLC

(57) ABSTRACT

An information input assistance device includes an identification unit, a generation unit, and a processing unit. The generation unit acquires attribute information corresponding to a user identified by the identification unit from a first memory, acquires rule information corresponding to a transmission destination of input information and a class of input information from a second memory, and generates the input information corresponding to the identified user on the basis of the acquired attribute information and the acquired rule information. The processing unit performs processing that transmits the input information generated by the generation unit to the transmission destination.

11 Claims, 11 Drawing Sheets

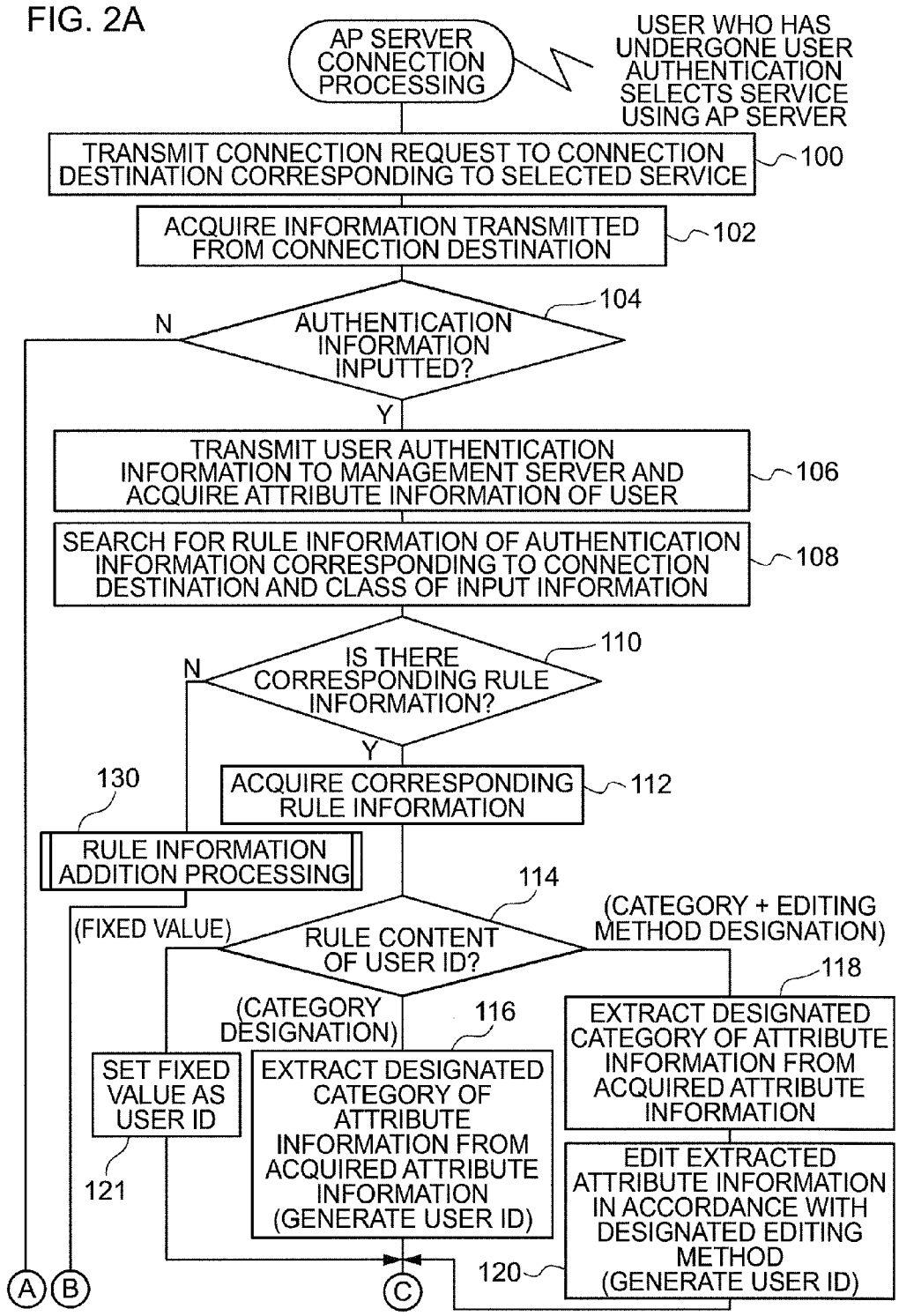

ONE EXAMPLE OF STATE WHERE USER ID HAS BEEN AUTOMATICALLY INPUTTED

ONE EXAMPLE OF AUTHENTICATION INFORMATION INPUT SCREEN

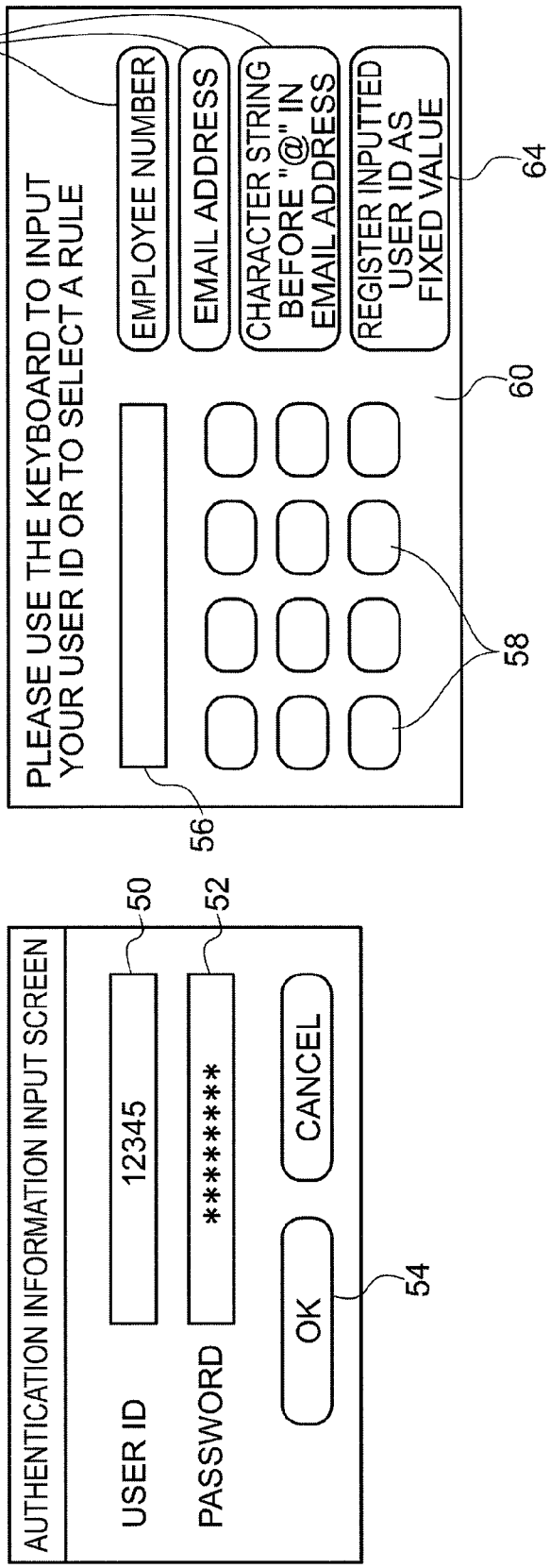

ONE EXAMPLE OF STATE WHERE USER ID HAS BEEN AUTOMATICALLY INPUTTED BY A DIFFERENT USER INSTRUCTING CONNECTION TO SAME CONNECTION DESTINATION AS (E)

ONE EXAMPLE OF STATE WHERE USER ID HAS BEEN AUTOMATICALLY INPUTTED BY RULE SELECTED VIA VIRTUAL KEYBOARD

ONE EXAMPLE OF CONNECTION DESTINATION-BASED RULE TABLE

| | CONNECTION DESTINATION URL | USER ID | PASSWORD |
|---|---|---|---|
| 1 | http://w1.fijixerox.co.jp/foo | RULE 2 | RULE 1 |
| 2 | http://w3.fijixerox.co.jp/public | TYPE 3: FIXED VALUE ("anonymous") | TYPE 5: FIXED VALUE ("") |

FIG. 5A

ONE EXAMPLE OF RULE DEFINITION TABLE

| RULE NAME | CONTENT OF RULE | RULE TYPE |
|---|---|---|
| RULE 1 | ASK USER TO INPUT | TYPE 4: INPUT |
| RULE 2 | EMPLOYEE NUMBER OF USER | TYPE 1: CATEGORY |
| RULE 3 | EMAIL ADDRESS OF USER | TYPE 1: CATEGORY |
| RULE 4 | CHARACTER STRING BEFORE "@" IN USER'S EMAIL ADDRESS | TYPE 2: CATEGORY + EDITING |

ONE EXAMPLE OF CONNECTION DESTINATION-BASED RULE TABLE AFTER ADDITION OF CONNECTION DESTINATION

| | CONNECTION DESTINATION URL | USER ID | PASSWORD |
|---|---|---|---|
| 1 | http://w1.fijixerox.co.jp/foo | RULE 2 | RULE 1 |
| 2 | http://w3.fijixerox.co.jp/public | FIXED VALUE ("anonymous") | FIXED VALUE ("") |
| 3 | http://www.acme.com/ | RULE 3 | RULE 1 |

FIG. 5D

ANOTHER EXAMPLE OF CONNECTION DESTINATION-BASED RULE TABLE AFTER ADDITION OF CONNECTION DESTINATION

| | CONNECTION DESTINATION URL | USER ID | PASSWORD |
|---|---|---|---|
| 1 | http://w1.fijixerox.co.jp/foo | RULE 2 | RULE 1 |
| 2 | http://w3.fijixerox.co.jp/public | FIXED VALUE ("anonymous") | FIXED VALUE ("") |
| 3 | http://www.acme.com/ | RULE 5 | RULE 1 |

FIG. 5E

ONE EXAMPLE OF RULE DEFINITION TABLE AFTER ADDITION OF RULE

| RULE NAME | CONTENT OF RULE | RULE TYPE |
|---|---|---|
| RULE 1 | ASK USER TO INPUT | TYPE 4: INPUT |
| RULE 2 | EMPLOYEE NUMBER OF USER | TYPE 1: CATEGORY |
| RULE 3 | EMAIL ADDRESS OF USER | TYPE 1: CATEGORY |
| RULE 4 | CHARACTER STRING BEFORE "@" IN USER'S EMAIL ADDRESS | TYPE 2: CATEGORY + EDITING |
| RULE 5 | 8 CHARACTERS STARTING WITH BEGINNING OF CHARACTER STRING BEFORE "@" IN USER'S EMAIL ADDRESS | TYPE 2: CATEGORY + EDITING |

INFORMATION INPUT ASSISTANCE DEVICE, COMPUTER-READABLE MEDIUM, AND INFORMATION INPUT ASSISTANCE METHOD

CROSS-REFERENCE TO RELATED APPLICATION

This application is based on and claims priority under 35 USC 119 from Japanese Patent Application No. 2010-054467 filed Mar. 11, 2010.

BACKGROUND

Technical Field

The present invention relates to an information input assistance device, a computer-readable medium storing an information input assistance program, and an information input assistance method.

SUMMARY

According to an aspect of the invention, there is provided an information input assistance device including: an identification unit that identifies a user; a generation unit that acquires attribute information corresponding to the user identified by the identification unit from a first memory which stores attribute information of users in regard to a plurality of users, acquires rule information corresponding to a transmission destination of input information and a class of input information from a second memory which stores, in correspondence with transmission destinations of input information and classes of input information, rule information representing rules for generating input information from attribute information of users, and generates the input information corresponding to the identified user on the basis of the acquired attribute information and the acquired rule information; and a processing unit that performs processing that transmits the input information generated by the generation unit to the transmission destination.

BRIEF DESCRIPTION OF THE DRAWINGS

An exemplary embodiment of the present invention will be described in detail based on the following figures, wherein:

FIGS. 2A and 2B are flowcharts showing the content of AP server connection processing;

FIGS. 4A to 4F are conceptual diagrams each showing one example of an authentication information input screen and a virtual keyboard; and FIGS. 5A to 5E are general diagrams each showing one example of a connection destination-based rule table and a rule definition table that configure a rule information table.

DETAILED DESCRIPTION

Figure 1:
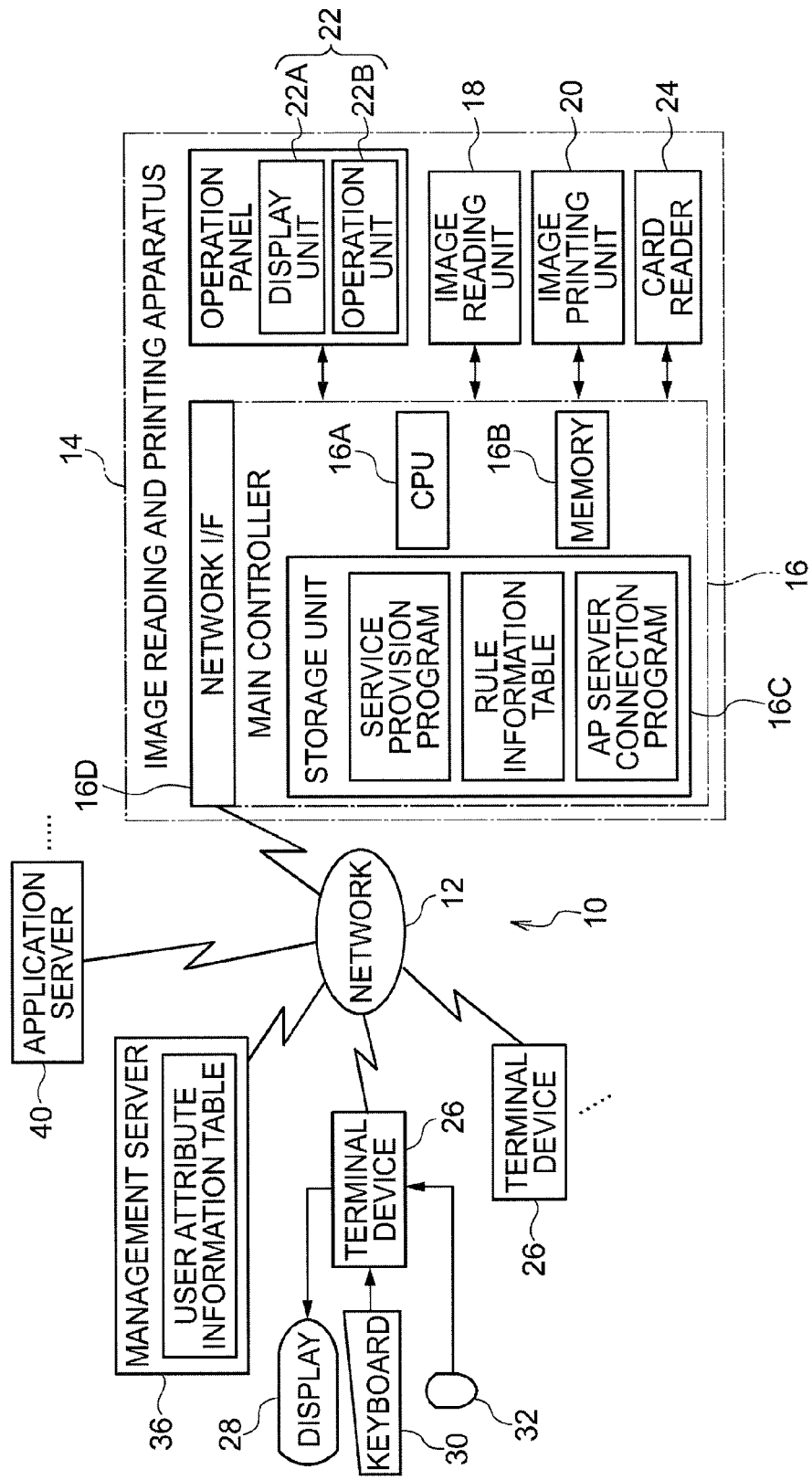
FIG. 1 is a block diagram showing the general configuration of a computer system pertaining to the exemplary embodiment.

An exemplary embodiment of the present invention will be described in detail below with reference to the drawings. In FIG. 1, there is shown the general configuration of a computer system 10 pertaining to the present exemplary embodiment. The computer system 10 is configured of an image reading and printing apparatus 14, plural terminal devices 26 including personal computers (PCs) or the like, a management server 36, and plural application servers (AP servers) 40 being connected to a network 12 including a local area network (LAN) or the Internet.

The image reading and printing apparatus 14 is equipped with a main controller 16 that includes a microcomputer or the like and has a built-in CPU 16A, a built-in memory 16B, a built-in nonvolatile storage unit 16C including a hard disk drive (HDD) or a flash memory, and a built-in network interface (I/F) 16D. An image reading unit 18 that optically reads reading target documents (paper documents) set thereon and outputs reading image data, an image printing unit 20 that prints an image represented by printing image data inputted thereto on recording paper, an operation panel 22 disposed with a display unit 22A serving as a display unit including an LCD or the like and an operation unit 22B serving as an input reception unit including a numerical keypad and a touch panel, and a card reader 24 that reads information such as card IDs recorded in IC cards (not shown) carried by individual users of the computer system 10 are each connected to the main controller 16. The card reader 24 is one example of an identification unit of the present invention.

The network I/F unit 16D of the main controller 16 is connected to the network 12 and performs communication via the network 12 with the terminal devices 26. A service provision program and an AP server connection program are each installed in the storage unit 16C of the main controller 16 as programs executed by the CPU 16A. The service provision program is for controlling the operation of each unit of the image reading and printing apparatus 14 and providing various kinds of services (e.g., copying of documents, printing of documents (printing of documents represented by document data received from the terminal devices 26 or represented by document data registered in databases (DBs) stored in storage units of the AP servers 40), and scan-to-server (a service that reads a document and uploads reading image data to the AP servers 40 to thereby cause the reading image data to be stored in storage areas disposed beforehand on the storage units of the AP servers 40)) to the users. The AP server connection program is for the CPU 16A to perform AP server connection processing described later. Moreover, a rule information table (details described later) is also stored in the storage unit 16C. The storage unit 16C of the main controller 16 is one example of a second memory of the present invention.

The AP server connection program is one aspect of an information input assistance program pertaining to the present invention. In the present exemplary embodiment, the AP server connection program is executed by the CPU 16A of the main controller 16 of the image reading and printing apparatus 14, whereby the image reading and printing apparatus 14 functions as one example of an information input assistance device pertaining to the present invention.

The individual AP servers 40 are computers for providing services (e.g., as described above, the service that prints DB-registered documents, the scan-to-server service) using the AP servers 40 to the users in cooperation with the image reading and printing apparatus 14. Application programs for realizing the services described above are installed in the storage units of the AP servers 40. A display 28, a keyboard 30, and a mouse 32 are each connected to each of the individual terminal devices 26. A user attribute information table in which plural categories of attribute information—such as user IDs, employee numbers, email addresses, and card IDs recorded in IC cards carried by the individual users—are registered in regard to the individual users of the computer system 10 is stored in a nonvolatile storage unit (not shown)

of the management server 36. The storage unit of the management server 36 is one example of a first memory of the present invention.

Figure 2B:
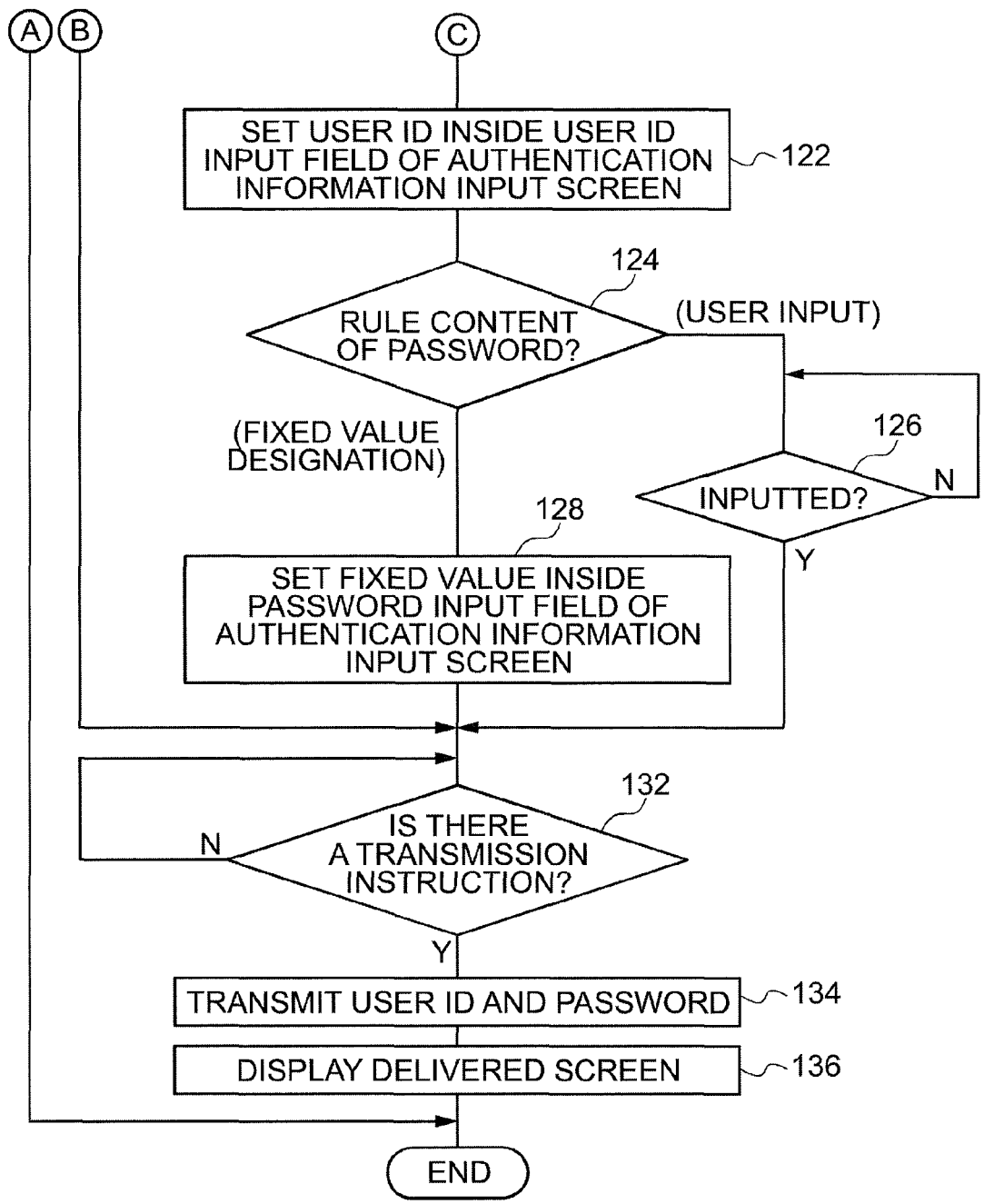

Next, the action of the present exemplary embodiment will be described. The main controller 16 of the image reading and printing apparatus 14 performs service provision processing that provides the various kinds of services to the users as a result of the service provision program being executed by the CPU 16A. When a user goes to the place where the image reading and printing apparatus 14 is installed, undergoes user authentication processing where the card reader 24 is caused to read information such as the card ID recorded in the IC card carried by the user, and selects a service using one of the AP servers 40 as a use target service, the service provision processing performs processing that calls up the AP server connection program in order to connect to the AP server 40 providing the selected service. Thus, the AP server connection program is executed by the CPU 16A, whereby the AP server connection processing is performed by the main controller 16 of the image reading and printing apparatus 14. This AP server connection processing will be described below with reference to FIGS. 2A and 2B.

In the AP server connection processing, first, in step 100, on the basis of the service selected by the user, the connection destination of the AP server 40 for receiving provision of that service is recognized and information requesting connection is transmitted to the connection destination it has recognized. In the storage unit 16C of the main controller 16, there is stored beforehand a connection destination table in which connection destination information (e.g., connection destination uniform resource locators (URLs)) including information of the connection target AP server 40 is registered for each of the individual services using the AP servers 40. In step 100, the connection destination table is searched for the service selected by the user, the corresponding connection destination information is read, and a webpage delivery request is transmitted to the connection destination represented by the connection destination information it has read.

In the next step 102, the information of the webpage transmitted from the connection destination AP server 40 is received to thereby acquire that information. In the next step 104, it is determined, on the basis of whether or not the screen represented by the information received from the AP server 40 is an authentication information input screen, whether or not input of authentication information is being requested from the AP server 40. When a service for which verification of the user is unnecessary (e.g., a service provided to unspecified users) in the provision of the service has been requested, the AP server 40 delivers to the image reading and printing apparatus 14 information of another screen (e.g., a screen on which details and the like of the provided service are selectable) other than an authentication information input screen. In this case, the other screen is displayed on the display unit 22A of the operation panel 22, the determination of step 104 becomes NO, the AP server connection processing ends, and the control returns to the service provision processing.

Figure 4B:
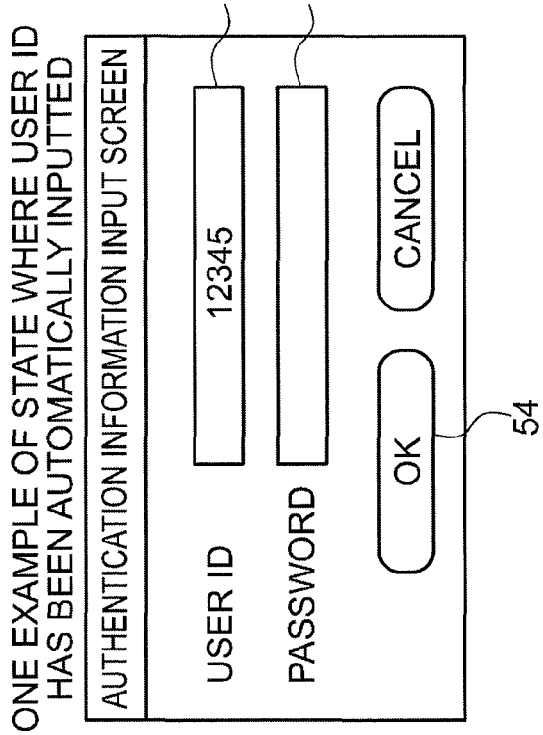
Figure 4A:

In the provision of the service that prints DB-registered documents or the scan-to-server service, for example, it is necessary to verify the user requesting provision of the service for the purpose of ensuring the security of the DB-registered documents or storing the uploaded data in storage regions that differ per user. In this manner, when the provision of a service for which verification of the user is necessary has been requested, the AP server 40 delivers to the image reading and printing apparatus 14 information of an authentication information input screen on which a user ID input field 50 and a password input field 52 are each disposed as shown in FIG. 4A as an example. This authentication information input screen is described in HyperText Markup Language (HTML), and a tag indicating that the field is a user ID input field is added to the user ID input field 50 and a tag indicating that the field is the password input field is added to the password input field 52. When the image reading and printing apparatus 14 receives the information of the authentication information input screen, it analyzes the tags added to the input fields 50 and 52 to thereby recognize that the class of information that should be inputted into the input field 50 is "user ID" and the class of information that should be inputted into the input field 52 is "password". When the information of the authentication information input screen has been delivered from the AP server 40, the delivered authentication information input screen is displayed on the display unit 22A of the operation panel 22, the determination of step 104 becomes YES, and the control moves to step 106.

Among the AP servers 40, there also exist AP servers 40 of a specification that does not deliver the information of the authentication information input screen to the connection source device but delivers only error information indicating that connection is not allowed because it has no authentication information. When the connection destination AP server 40 is an AP server 40 of this specification, an authentication information input screen on which a user ID input field 50 and a password input field 52 are each disposed as shown in FIG. 4A as an example is generated by the image reading and printing apparatus 14 that is a connection source device, and the generated authentication information input screen is displayed on the display unit 22A of the operation panel 22. In this case also, the determination of step 104 becomes YES, and the control moves to step 106.

In the next step 106, user identification information (the card ID read from the IC card carried by the user) is transmitted to the management server 36 to thereby request attribute information of the user specified by the transmitted user identification information. Thus, the management server 36 searches the user attribute information table for the user identification information received from the image reading and printing apparatus 14, reads from the user attribute information table all of the attribute information (user ID, employee number, email address, etc.) corresponding to the same user as the user identification information received, and transmits all of that attribute information to the main controller 16. In step 106, the main controller 16 receives these pieces of attribute information and stores them in the memory 16B.

Because of the spread of application service providers (ASPs) and software as a service (SaaS), even in a system installed inside a company where there is the computer system 10 pertaining to the present exemplary embodiment, configurations where the image reading and printing apparatus 14 provides services to users in cooperation with the AP servers 40 provided by outside service providers are increasing. However, in that case, user IDs for using the AP servers 40 are assigned in accordance with assignment rules on the side of the service providers, and passwords are also set so as to satisfy standards (e.g., numbers of digits and kinds of usable characters) that the service providers have decided upon, so it is necessary for a user receiving provision of services realized as a result of the image reading and printing apparatus 14 cooperating with the AP servers 40 provided by the outside service providers to input authentication information (user ID and password) that differs per service using the AP servers 40 provided by the mutually different service providers. Even in a system installed inside a company where there is the computer system 10 including the AP servers 40, a situation may arise where the authentication information in all of the services provided as a result of the image reading and printing apparatus 14 cooperating with the AP servers 40 cannot be unified.

For this reason, in the present exemplary embodiment, the rule information table is stored in the storage unit 16C of the main controller 16. This rule information table is configured from a connection destination-based rule table shown in FIG. 5A and a rule definition table shown in FIG. 5B. The connection destination-based rule table is configured as a result of pieces of rule information representing input information rules each being registered, in regard to mutually different plural kinds of services using the AP servers 40, in correspondence with connection destination information (connection destination URLs) for receiving provision of those services and classes of information (in the example shown in FIG. 5A, "user ID" and "password") that should be inputted when receiving provision of those services (rule information corresponded with "user ID" represents a rule where a user ID should be inputted when receiving provision of a service, and rule information corresponded with "password" represents a rule where a password should be inputted when receiving provision of a service). The rule definition table is configured as a result of pieces of information representing a name, content, and a type of rule each being registered in regard to all rules applied to at least one class of input information of the classes of input information (e.g., "user ID" and "password"). Of the rule information of the user IDs and passwords registered in the connection destination-based rule table, in regard to a user ID or a password that applies a rule whose content is registered in the rule definition table, only the name of the rule ("rule 1", "rule 2", etc.) is registered as the rule information.

In step 108, the connection destination-based rule table is searched for the connection destination information used in the information transmission in step 100 and the class of input information recognized on the basis of the tags added to the input fields of the authentication information input screen. In the next step 110, it is determined, on the basis of the result of the search in step 108, whether or not rule information corresponding to the connection destination for receiving provision of the service selected by the user and the class of input information is registered in the connection destination-based rule table. When this determination is YES, the control moves to step 112, reads the corresponding rule information, and causes the memory 16B to store that rule information. Below, description will be advanced taking as an example a case where the classes of input information for receiving provision of the service selected by the user are "user ID" and "password".

In the next step 114, the content of the rule represented by the rule information corresponding to the "user ID" class of input information of the rule information read in step 112 is determined and the processing branches depending on the determination result. In the present exemplary embodiment, as rules corresponding to "user ID", any of a first type (form) of rules (rules 2 and 3 shown in FIG. 5B) that designate a category of the attribute information to be used as the user ID, a second type (form) of rules (rule 4 shown in FIG. 5B) that designate a category of the attribute information to be used as the user ID and designates a method of editing the designated attribute information, and a third type (form) of rules (see "fixed value ('anonymous')" shown in FIG. 5A) that designate a fixed value as the user ID is used. In the connection destination-base rule table, any of the first to third types of rules is set as rules corresponding to the user ID for each of the individual connection destinations depending on the user ID application rule in the individual connection destinations.

When the user ID rule information read in step 112 represents rule content corresponding to the first type of rule, the control moves from step 114 to step 116 and attribute information of the category designated by the user ID rule information read in step 112 is extracted as the user ID from among the pieces of user attribute information acquired in step 106. Then, the control moves to step 122.

When the user ID rule information read in step 112 represents rule content corresponding to the second type of rule, the control moves from step 114 to step 118 and attribute information of the category designated by the user ID rule information read in step 112 is extracted from among the pieces of user attribute information acquired in step 106. In the next step 120, a user ID is generated by editing, in accordance with the editing method designated by the user ID rule information read in step 112, the attribute information extracted in step 118. Then, the control moves to step 122.

When the user ID rule information read in step 112 represents rule content corresponding to the third type of rule, the control moves from step 114 to step 121 and the fixed value stipulated by the rule information is set as the user ID. Then, the control moves to step 122. Step 106 to step 121 described above are, together with step 128 described below, one example of processing by a generation unit of the present invention.

In step 122, the user ID obtained by the processing of step 116 or step 120 or step 121 is set inside the user ID input field 50 of the authentication information input screen being displayed on the display unit 22A of the operation panel 22. Thus, as shown in FIG. 4B as an example, inside the user ID input field 50 of the authentication information input screen, the proper user ID is set and displayed in accordance with the user ID rule (rule information) registered in the connection destination-based rule table and without the user having to perform an operation that inputs the user ID. Step 122 is one example of processing by a processing unit of the present invention.

In step 124, the content of the rule represented by the rule information corresponding to the "password" class of input information of the rule information read in step 112 is determined and the processing branches depending on the determination result. In the present exemplary embodiment, as rules corresponding to "password", either of a fourth type (form) of rule (rule 1 shown in FIG. 5B) that asks the user to input the password and a fifth type (form) of rule ("fixed value (' '")" shown in FIG. 5A) that designates a fixed value as the password is used. In the connection destination-based rule table, the fourth type of rule or the fifth type of rule is set as a password rule for each of the individual connection destinations depending on the password application rule (fixed value or not) in the individual connection destinations.

When the password rule information read in step 112 represents rule content corresponding to the fourth type of rule, the control moves from step 124 to step 126 and it is determined whether or not the password has been inputted by the user. Step 126 is repeated until the determination becomes YES. When the password is inputted inside the password input field 52 of the authentication information input screen as a result of the operation unit 22B of the operation panel 22 being operated by the user, the determination of step 126 becomes YES and the control moves to step 132. As an example, in FIG. 4C, there is shown a state where the password has been inputted inside the password input field 52 by the user after the user ID has been set and displayed inside the user ID input field 50 of the authentication information input screen.

When the password rule information read in step 112 represents rule content corresponding to the fifth type of rule, the control moves from step 124 to step 128 and the fixed value stipulated by the rule information is set as the password. Then, the control moves to step 132.

In the next step 132, it is determined whether or not transmission of the user ID and the password has been instructed. Step 132 is repeated until the determination becomes YES. As shown in FIGS. 4A to 4C, on the authentication information input screen, there is disposed a button 54 for instructing transmission of the user ID and the password. When the user verifies the user ID displayed inside the input field 50 and the password displayed inside the input field 52 of the authentication information input screen and performs an operation that selects the button 54, the determination of step 132 becomes YES and the control moves to step 134. In step 134, the user ID being displayed inside the input field 50 and the password being displayed inside the input field 52 of the authentication information input screen are transmitted to the connection destination to which information requesting connection is transmitted in step 100.

Thus, in the connection destination AP server 40, on the basis of the combination of the user ID and the password received from the image reading and printing apparatus 14, user authentication processing that verifies whether or not the user requesting provision of a service via the image reading and printing apparatus 14 is a legitimate user is performed. When it has been verified by the user authentication processing that the user is a legitimate user, the AP server 40 delivers to the image reading and printing apparatus 14 information of another screen (e.g., a screen on which details and the like of the provided service are selectable) other than the authentication information input screen. When the image reading and printing apparatus 14 receives this information, it displays on the display unit 22A of the operation panel 22 the screen (webpage) represented by the information received from the AP server 40 in step 136 and ends the AP server connection processing. Thus, the control returns to the service provision processing.

Next, processing when user ID and password rule information corresponding to the connection destination for receiving provision of the service selected by the user is not registered in the connection destination-based rule table will be described. Examples of cases where this situation arises include connecting to a connection destination to which the image reading and printing apparatus 14 has not connected in the past. When user ID and password rule information corresponding to the connection destination is not registered in the connection destination-based rule table, the determination of step 110 becomes NO and the control moves to step 130, where rule information addition processing is performed.

Figure 3A:
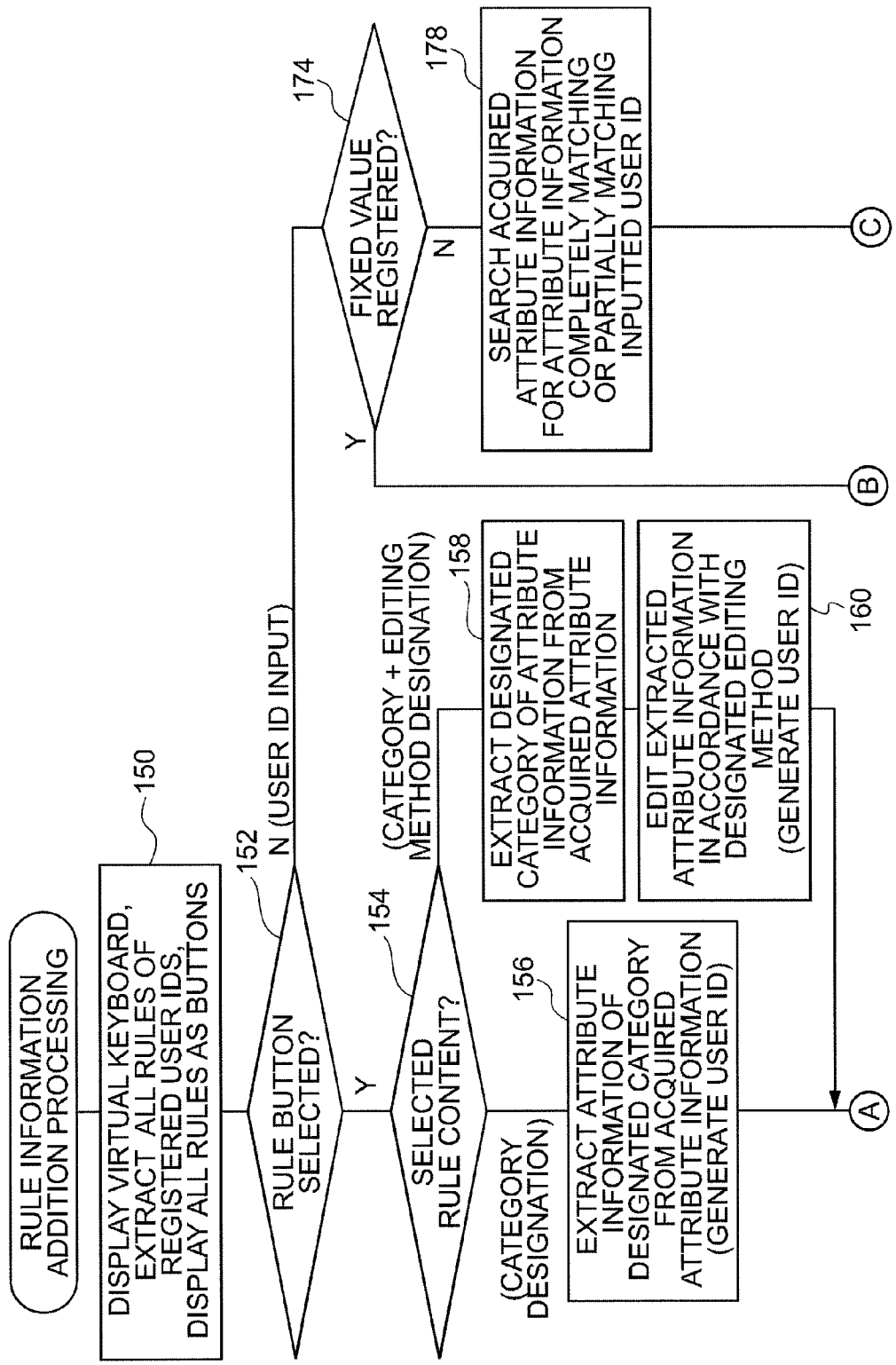
FIGS. 3A and 3B are flowcharts showing the content of rule information addition processing.

This rule information addition processing will be described with reference to FIGS. 3A and 3B. In step 150, as shown in FIG. 4D as an example, the display unit 22A of the operation panel 22 displays a virtual keyboard 60 disposed with a user ID input field 56 and plural keys 58 for inputting the user ID. In this step 150, all of the rules (rule information) of the user IDs registered in the rule information table is extracted, the virtual keyboard 60 additionally displays rule buttons 62 corresponding to the extracted individual rules, and also the virtual keyboard 60 additionally displays a button 64 for instructing generation of rule information that sets as a fixed value the user ID inputted inside the input field 56.

When some operation is performed by the user with respect to the virtual keyboard 60 displayed on the display unit 22A of the operation panel 22, the control moves to step 152 and it is determined whether or not the operation by the user is an operation that selects one of the rule buttons 62. When the virtual keyboard 60 is displayed on the display unit 22A of the operation panel 22, the user recognizes the user ID application rule in the connection destination this time and judges whether or not the recognized application rule matches a user ID rule represented by any of the rule buttons 62 being displayed on the virtual keyboard 60. When there exists a rule button 62 representing a user ID rule matching the recognized application rule, the user performs an operation that selects that rule button 62. When the operation described above is performed by the user, the determination of step 152 becomes YES and the control moves to step 154.

In step 154, the content of the user ID rule represented by the rule button 62 selected by the user is determined and the processing branches depending on the determination result. Here, when the content of the user ID rule represented by the rule button 62 selected by the user is rule content corresponding to the first type of rule, the control moves from step 154 to step 156 and attribute information of the category designated by the user ID rule represented by the rule button 62 selected by the user is extracted as the user ID from among the pieces of user attribute information acquired in step 106. Then, the control moves to step 162.

When the content of the user ID rule represented by the rule button 62 selected by the user is rule content corresponding to the second type of rule, the control moves from step 154 to step 158 and attribute information of the category designated by the user ID rule represented by the rule button 62 selected by the user is extracted from among the pieces of user attribute information acquired in step 106. In the next step 160, a user ID is generated by editing, in accordance with the editing method designated by the user ID rule represented by the rule button 62 selected by the user, the attribute information extracted in step 158. Then, the control moves to step 162.

In step 162, the user ID rule information represented by the rule button 62 selected by the user additionally registered in the connection destination-based rule table in correspondence with the connection destination information of the connection destination this time. Step 150 to step 164 described above are one example of processing by the generation unit of the present invention.

In step 164, the display unit 22A of the operation panel 22 redisplays the authentication information input screen and the user ID generated in step 156 or step 160 is set inside the user ID input field 50 of the redisplayed authentication information input screen. Thus, as shown in FIG. 4E as an example, inside the user ID input field 50 of the authentication information input screen, the proper user ID is set and displayed in accordance with the user ID rule represented by the rule button 62 selected by the user and without the user having to perform an operation that inputs the user ID.

In step 166, a button 66 (see also FIG. 4E) for instructing generation of rule information that sets as a fixed value the password inputted into the password input field 52 additionally displays on the authentication information input screen redisplayed on the display unit 22A of the operation panel 22. In the next step 168, it is determined whether or not the password has been inputted by the user. Step 168 is repeated until the determination becomes YES. The user recognizes the password application rule (fixed value or not) in the connection destination this time, and if the recognized application rule is a fixed value, the user selects the button 66 on the authentication information input screen and thereafter performs an operation that inputs the password inside the password input field 52, and if the recognized application rule is not a fixed value, the user does not select the button 66 on the authentication information input screen and performs an operation that inputs the password inside the password input field 52.

When the password is inputted inside the password input field 52 as a result of any of the operations described above being performed, the determination of step 168 becomes YES and the control moves to step 170, where it is determined whether or not an operation that selects the button 66 has been performed by the user. When this determination is NO, the control moves to step 171 and password rule information representing the fourth type of rule that asks the user to input the password is additionally registered in the connection destination-based rule table in correspondence with the connection destination information of the connection destination this time. Then, the rule information addition processing ends. When the determination of step 170 is YES, the control moves to step 172 and additionally registers, in the connection destination-based rule table in correspondence with the connection destination information of the connection destination this time, password rule information representing the fifth type of rule that designates as a fixed value of the password the password inputted inside the password input field 52 by the user. Then, the rule information addition processing ends.

As an example, in FIG. 5C, in a state where the information shown in FIG. 5A is registered in the connection destination-based rule table, as a new connection destination for which corresponding user ID and password rule information is unregistered, connection to connection destination URL "http://www.acme.com" is performed, whereby the virtual keyboard 60 shown in FIG. 4D is displayed on the display unit 22A of the operation panel 22. FIG. 5C shows a state where the connection destination information (connection destination URL) and the user ID and password rule information have been additionally registered in the connection destination-based rule table when, in regard to the user ID, the rule button 62 corresponding to the rule designating the email address of the user attribute information as the user ID has been selected by the user and when, in regard to the password, an operation that inputs the password inside the password input field 52 without selecting the button 66 has been performed by the user.

Figure 4F:
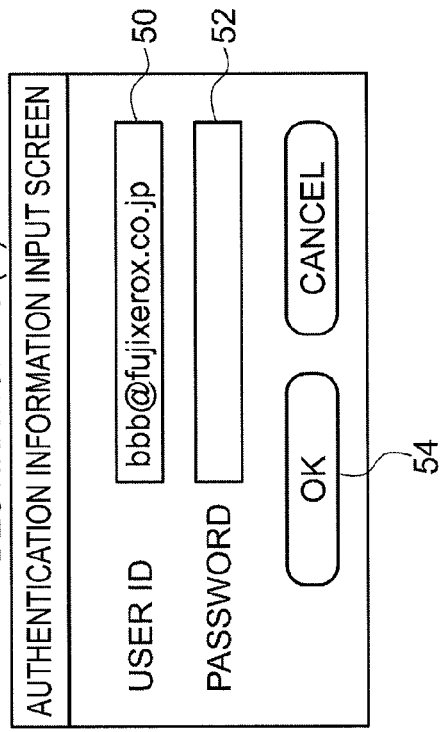
Figure 4E:
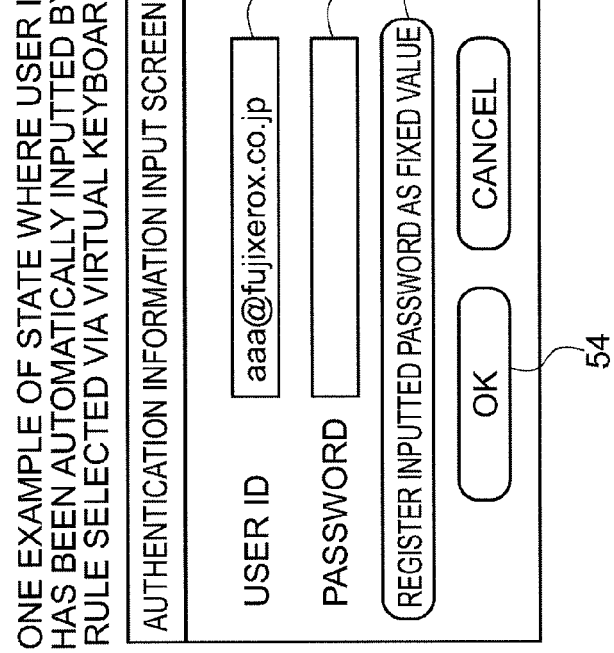

When the connection destination-based rule table is updated to the state shown in FIG. 5C, when, for example, a different user selects as a use target service a service for which connection to the connection destination URL "http://www.acme.com" is necessary, then in accordance with the user ID rule information that has been additionally registered in the connection destination-based rule table in correspondence with the connection destination information (connection destination URL) described above, the email address of the different user becomes displayed in the user ID input field 50 as shown in FIG. 4F.

In a state where the virtual keyboard 60 is displayed on the display unit 22A of the operation panel 22 in step 150, when there does not exist a rule button 62 representing a user ID rule matching the user ID application rule in the connection destination this time, if the user ID application rule in the connection destination this time is a fixed value, the user selects the button 64 inside the virtual keyboard 60 and thereafter performs an operation that operates the keys 58 of the virtual keyboard 60 to input the user ID inside the input field 56, and if the user ID application rule is not a fixed value, the user does not select the button 64 inside the virtual keyboard 60 and performs an operation that operates the keys 58 of the virtual keyboard to input the user ID inside the input field 56.

When the user ID has been inputted inside the input field 56 as a result of any of the operations described above being performed, the determination of step 152 becomes NO and the control moves to step 174, where it is determined, on the basis of whether or not an operation that selects the button 64 has been performed by the user, whether or not generation of rule information that sets, as a fixed value, the user ID inputted into the input field 56 has been instructed. When this determination is YES, the control moves to step 176 and generates rule information representing the third type of rule that designates, as a fixed value of the user ID, the user ID inputted inside the input field 56 by the user. Then, the control moves to step 162. In this case, in step 162, the rule information generated in step 176 is additionally registered, as user ID rule information, in the connection destination-based rule table in correspondence with the connection destination information of the connection destination this time. In the next step 164, the authentication information input screen is redisplayed on the display unit 22A of the operation panel 22, and the user ID inputted inside the input field 56 of the virtual keyboard 60 is set inside the user ID input field 50 of the authentication information input screen.

In a state where the virtual keyboard 60 is displayed on the display unit 22A of the operation panel 22 in step 150, when there does not exist a rule button 62 representing a user ID rule matching the user ID application rule in the connection destination this time and the user ID application rule in the connection destination this time is not a fixed value, the user does not select the button 64 inside the virtual keyboard 60 and performs an operation that inputs the user ID inside the input field 56 of the virtual keyboard 60, whereby the determination of step 174 becomes NO and the control moves to step 178. In step 178, it is searched whether or not attribute information completely matching the user ID inputted inside the input field 56 or attribute information partially matching the inputted user ID (attribute information including all characters of the user ID) exists among the pieces of user attribute information acquired in step 106.

In the next step 180, it is determined whether or not the corresponding information (attribute information completely matching or partially matching the user ID inputted inside the input field 56) has been extracted by the search of step 178. When this determination is NO, it is difficult to discriminate the user ID rule from the user ID inputted inside the input field 56. The control moves to step 164 and, without performing generation of rule information or additional registration in the connection destination-based rule table, in step 164, processing is performed that redisplays the authentication information input screen on the display unit 22A of the operation panel 22 and sets the user ID inputted inside the input field 56 of the virtual keyboard 60 inside the user ID input field 50 of the authentication information input screen.

When the determination of step 180 is YES, the control moves to step 182 and it is determined whether or not attribute information completely matching the user ID inputted inside the input field 56 extracted in the search of step 178. When the determination of step 182 is YES, it is judged that the user ID rule in the connection destination this time is a rule that uses, as the user ID, the attribute information completely matching the user ID inputted inside the input field 56. Then, the control moves to step 184, where, as user ID rule information, rule information of content that designates, as a category of attribute information to be used as the user ID, the category of attribute information completely matching the user ID inputted inside the input field 56 is generated and the generated rule information is additionally registered in the rule definition table together with the name of the generated rule information. Thereafter, the control moves to step 162.

In this case, in step 162, the rule information generated in step 184 is additionally registered, as user ID rule information, in the connection destination-based rule table in correspondence with the connection destination information of the connection destination this time. In the next step 164, the authentication information input screen is redisplayed on the display unit 22A of the operation panel 22, and the user ID inputted inside the input field 56 of the virtual keyboard 60 is set inside the user ID input field 50 of the authentication information input screen. Once the processing described above is performed, when, for example, a different user selects as a use target service a service for which connection to the connection destination URL "http://www.acme.com" is necessary, then in accordance with the user ID rule information that has been additionally registered in the connection destination-based rule table in correspondence with the connection destination information (connection destination URL) described above, the attribute information of the different user whose category is designated by that rule information becomes set and displayed in the user ID input field 50.

When attribute information that includes all characters of the user ID inputted inside the input field 56 and partially matches the inputted user ID (attribute information where extra characters have been added to the inputted user ID) has been extracted by the search of step 178, the determination of step 182 becomes NO and the control moves to step 186, where an editing method for causing the extracted attribute information to completely match the user ID inputted inside the input field 56 is derived. This editing method is derived specifically, for example, by generating a first editing method that extracts, from the individual characters configuring the extracted attribute information, the extra characters with respect to the user ID inputted inside the input field 56 and deleting the extracted characters. When the character string after deleting the extra characters in accordance with the first editing method generated from the extracted attribute information does not match the user ID inputted inside the input field 56, a second editing method that changes the order of the characters in that character string is generated such that it matches the user ID inputted inside the input field 56.

In the next step 188, as user ID rule information, rule information of content that stipulates the user ID by designating the category of attribute information partially matching the user ID inputted inside the input field 56 as the category of attribute information to be used as the user ID and designating the editing method generated in step 186 as the editing method with respect to that category of attribute information is generated, and the generated rule information is additionally registered together with the name of the rule information in the rule definition table. Thereafter, the control moves to step 162. As an example, in FIG. 5E, there is shown a state where rule information that designates the "email address" of the user as the category of attribute information to be used as the user ID and represents extracting "8 characters starting with beginning of character string before '@'" as one example of the editing method with respect to "email address" has been additionally registered together with the name "rule 5" in the rule definition table.

In this case, in step 162, the rule information generated in step 184 is additionally registered, as user ID rule information, in the connection destination-based rule table in correspondence with the connection destination information of the connection destination this time. As an example, in FIG. 5D, there is shown a state where the rule information of "rule 5" shown in FIG. 5E has been additionally registered, as user ID rule information, in the connection destination-based rule table in correspondence with the connection destination information (connection destination URL "http://www.acme.com"). In the next step 164, the authentication information input screen is redisplayed on the display unit 22A of the operation panel 22, and the user ID inputted inside the input field 56 of the virtual keyboard 60 is set inside the user ID input field 50 of the authentication information input screen.

Once the processing described above is performed, when, for example, a different user selects as a use target service a service for which connection to the connection destination URL "http://www.acme.com" is necessary, then in accordance with the user ID rule information ("rule 5") that has been additionally registered in the connection destination-based rule table in correspondence with the connection destination information (connection destination URL) described above, the character string of the 8 characters starting with the beginning of the character string before "@" in the email address of the different user becomes set and displayed in the user ID input field 50. Step 178 to step 188 and step 162 are one example of processing by a rule management unit of the present invention.

Figure 3B:
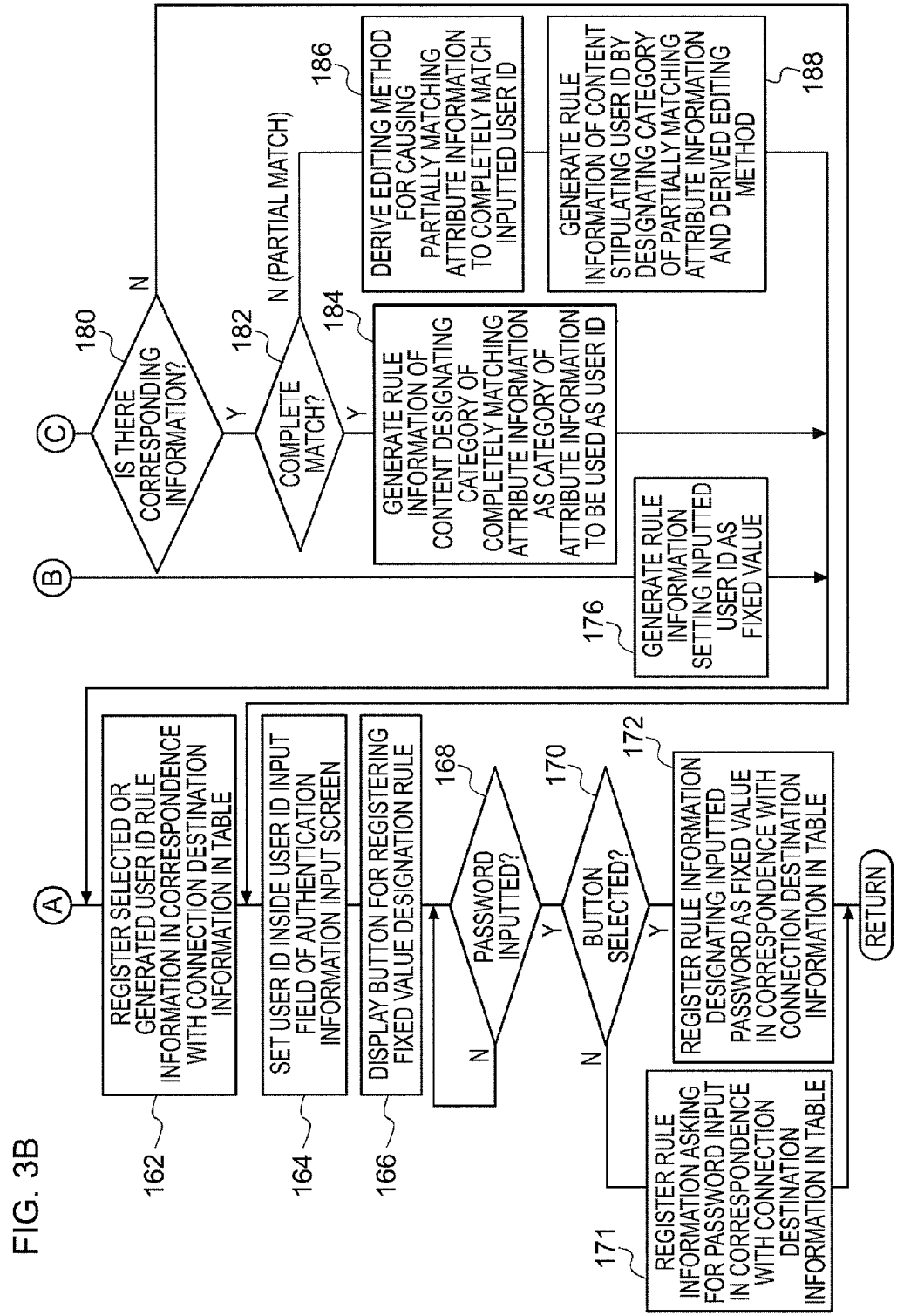

When rule information is generated on the basis of attribute information that includes all characters of the user ID inputted by the user and partially matches the inputted user ID as in steps 186 and 188 of FIG. 3B, a case where plural kinds of rule information are capable of being generated may also arise because, for example, of the reason that plural pieces of attribute information matching the conditions described above exist. In this case, it may also be configured to additionally register plural pieces of rule information in the connection destination-based rule table in correspondence with the same connection destination information and, when a service for which connection to the same connection destination is necessary has been selected as a use target service by a different user, generates plural pieces of authentication information in accordance with the plural kinds of rule information and causes them to be displayed as input target authentication information targets. In this case, when any of the pieces of authentication information is selected, it is desirable for the rule information corresponding to the authentication information which not selected to be deleted from the connection destination-based rule table and the rule definition table.

In the description above, there has been described an aspect where, as a user ID rule, any of the first type of rule that designates the category of attribute information to be used as the user ID, the second type of rule that designates the category of attribute information to be used as the user ID and designates the method of editing the designated attribute information, and the third type of rule that designates a fixed value as the user ID is used, and where, as a password rule, either of the fourth type of rule that asks the user to input the password and the fifth type of rule that designates a fixed value as the password is used, but the present invention is not limited to this. For example, any of the first type of rule to the third type of rule may also be excluded from the user ID rules and a rule similar to the first type of rule or the second type of rule may also be used as the password rule.

In the description above, there has been described an aspect where, when the authentication information such as the user ID or the password is generated, the generated authentication information is set and displayed in the corresponding input field inside the authentication information input screen and the generated authentication information is transmitted to the AP server 40 upon receiving an instruction from the user, but the present invention is not limited to this. It may also be configured such that, when it has generated the user ID and the password, it transmits the generated user ID and password to the AP server 40. In this case, setting and display of the user ID and the password in the corresponding input fields inside the authentication information input screen may be omitted, and display of the authentication information input screen itself may also be omitted. In this aspect, the processing that transmits the user ID and the password to the AP server 40 is also one example of processing by the processing unit of the present invention.

In the description above, there has been described an aspect where the rule information in correspondence with the connection destination information (connection destination URL) and the class of input information (user ID and password) for each of the individual connection destinations is registered in the connection destination-based rule table of the rule information table, but the present invention is not limited to this. When the AP servers 40 are configured to apply screen IDs or the like to the individual authentication information input screens that the connection destination individual AP servers 40 deliver and to apply input field IDs to the individual authentication information input fields (e.g., the user ID or the password input field) inside the individual authentication information input screens and to deliver information in which the corresponding screen ID and input field ID are embedded as the information of the authentication information input screen, it may also be configured to use the combination of the screen ID and the input field ID as the class of the input information and to register the rule information in the rule information table in correspondence with the connection destination information (connection destination URL) and the combination of the screen ID and the input field ID. In this case, the screen ID and the input field ID may also be extracted from the information of the authentication information input screen delivered from the AP server 40, the rule information corresponding to the connection destination URL and the combination of the extracted screen ID and input field ID is read from the rule information table, and the authentication information (e.g., user ID or password) is generated in accordance with the read rule information.

In the description above, there has been described an aspect where the user receiving provision of a service using one of the AP servers 40 operates the operation panel 22 of the image reading and printing apparatus 14, but the present invention is not limited to this. For example, in an aspect where the user performs an instruction for receiving provision of a service or input of authentication information via the terminal device 26 and the image reading and printing apparatus 14 receiving this instruction or authentication information via the network 12 connects to the AP server 40, it may be configured to perform processing that generates the authentication information on the basis of the rule information corresponding to the connection destination and the class of the input information and delivers to the terminal device 26 a screen where the generated authentication information has been set inside the input field inside the authentication information input screen whose information has been delivered from the AP server 40 or transmits the generated authentication information to the AP server 40 and delivers the result thereof to the terminal device 26.

In the description above, there has been described an aspect where the image reading and printing apparatus 14 pertaining to the present exemplary embodiment is caused to function as the information input assistance device pertaining to the present invention, but the present invention is not limited to this. For example, electronic devices such as PCs or portable terminals used by plural users may also be caused to function as the information input assistance device pertaining to the present invention, and when authentication information has been requested from a connection destination, these electronic devices may be configured to perform processing that generates the authentication information on the basis of the rule information corresponding to the connection destination and the class of the input information and sets the generated authentication information inside the authentication information input fields of the authentication information input screen delivered from the connection destination or transmits the generated authentication information to the connection destination. In this case, the identification unit of the present invention may employ a configuration that identifies the user on the basis of user identification information that the individual users have inputted when starting use of the electronic devices.

In the description above, the user attribute information table is stored in the storage unit of the management server 36 connected via the network 12 to the image reading and printing apparatus 14, whereby the storage unit of the management server 36 is used as one example of the first memory recited in claim 1 and the like, but the present invention is not limited to this. The present invention may also employ a configuration where the user attribute information table is stored in the storage unit 16C of the image reading and printing apparatus 14, whereby the storage unit 16C of the image reading and printing apparatus 14 is used as one example of the first memory.

Moreover, in the description above, authentication information has been described as one example of input information in the present invention, but the present invention is not limited to this and may also be applied to the input of arbitrary information by a user. In particular, the aspect that uses individual combinations of screen IDs and input field IDs as the classes of the input information as described above is also easily expanded to input screens other than authentication information input screens and information input fields other than authentication information input fields and is also suitable for the input of arbitrary information other than authentication information by a user.

In the description above, there has been described an aspect where the AP server connection program serving as one example of the information input assistance program pertaining to the present invention is stored (installed) beforehand in the storage unit 16C of the main controller 16 of the image reading and printing apparatus 14, but the information input assistance program pertaining to the present invention may also be provided in a configuration where it is recoded in a recording medium such as a CD-ROM or a DVD-ROM.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to be suited to the particular use contemplated. It is intended that the scope of the invention be defined by the following claims and their equivalents.

What is claimed is:

1. An information input assistance device comprising:
a controller configured to:
identify a user;

acquire attribute information corresponding to the identified user from a first memory which stores attribute information of a plurality of users;

acquire rule information corresponding to a transmission destination of input information and a class of input information from a second memory which stores, in correspondence with transmission destinations of input information and classes of input information, rule information representing rules indicating methods used to generate input information from attribute information of users; and generate the input information corresponding to the identified user by applying the acquired rule to the acquired attribute information; and perform processing that transmits the generated input information to the transmission destination, wherein, when attribute information completely matching the input information exists within the attribute information that is read from the first memory and that corresponds to the identified user, the controller generates a rule designating a category of the completely matching attribute information, and, when attribute information partially matching the input information exists within the attribute information, the controller determines an editing method for causing the partially matching attribute information to completely match the input information and generates a rule that designates a category of the partially matching attribute information and the determined editing method.

2. The information input assistance device according to claim 1, wherein:

the input information includes authentication information of which input thereof into an authentication information input field inside an input screen delivered from an instructed connection destination is requested when connecting to the connection destination;

when the input screen is delivered from the connection destination, the controller acquires rule information corresponding to the connection destination of a delivery source of the input screen and a class of the attribute information of which input thereof into the authentication information input field is requested from the second memory which stores the rule information in correspondence with connection destinations serving as transmission destinations of the input information and classes of the input information, and generates the authentication information serving as the input information on the basis of the acquired attribute information and the acquired rule information; and performs processing that transmits the generated authentication information to the connection destination.

3. The information input assistance device according to claim 1, wherein:

the input information includes authentication information of which input thereof into an authentication information input field inside an input screen delivered from an instructed connection destination is requested when connecting to the connection destination;

when the input screen is delivered from the connection destination, the controller acquires rule information corresponding to the connection destination of a delivery source of the input screen and the authentication information input field inside the delivered input screen from the second memory which stores the rule information in correspondence with connection destinations serving as transmission destinations of the input information and information identifying input fields inside input screens to which the input information is to be inputted and serving as classes of the input information, and generates the authentication information serving as the input information on the basis of the acquired attribute information and the acquired rule information; and performs processing that inputs the generated authentication information into the authentication information input field inside the delivered input screen.

4. The information input assistance device according to claim 1, wherein, when the rule information acquired from the second memory is information which designates a category of attribute information to be used as the input information, the controller generates the input information corresponding to the identified user by extracting attribute information corresponding to the category designated by the rule information from the attribute information acquired from the first memory.

5. The information input assistance device according to claim 1, wherein, when the rule information acquired from the second memory includes information designating a category of attribute information to be used as the input information and a method of editing the attribute information, the controller extracts attribute information corresponding to the category designated by the rule information from the attribute information acquired from the first memory, edits the extracted attribute information in accordance with the editing method designated by the rule information, and generates the input information corresponding to the identified user.

6. The information input assistance device according to claim 1, wherein, when rule information corresponding to the transmission destination of the input information and the class of the input information is not stored in the second memory, the controller presents to the user, as options, the rules represented by pieces of rule information stored in the second memory, generates the input information corresponding to the identified user on the basis of a rule selected by the user from among a plurality of rules presented, and causes the second memory to additionally store the rule information representing the selected rule in correspondence with the transmission destination of the input information and the class of the input information.

7. The information input assistance device according to claim 1, wherein the controller, when the input information is input by the user, checks the input information against the acquired attribute information that corresponds to the identified user, generates a rule for generating the input information from the attribute information of the user, and causes the second memory to additionally store rule information representing the generated rule in correspondence with the transmission destination of the input information and the class of the input information.

8. An information input assistance device comprising:
a controller that is configured to:
identify a user;
read attribute information corresponding to the identified user from a first memory which stores attribute information for a plurality of users, reads rule information corresponding to a transmission destination of input information and a class of input information from a second memory which stores, in correspondence with transmission destinations of input information and classes of input information, rule information representing rules for generating input information from attribute information of users, and generates the input information corresponding to the identified user on the basis of the acquired attribute information and the acquired rule information;

performs processing that transmits the generated input information to the transmission destination; and when the input information is input by the user, checks the input information against the acquired attribute information that corresponds to the identified user, generates a rule for generating the input information from the attribute information of the user, and causes the second memory to additionally store rule information representing the generated rule in correspondence with the transmission destination of the input information and the class of the input information, wherein, when attribute information completely matching the input information exists within the attribute information that is read from the first memory and that corresponds to the identified user, the controller generates a rule designating a category of the completely matching attribute information, and, when attribute information partially matching the input information exists within the attribute information, the controller determines an editing method for causing the partially matching attribute information to completely match the input information and generates a rule that designates a category of the partially matching attribute information and the determined editing method.

9. A non-transitory computer-readable medium storing a program for causing a computer to perform information input assistance processing, the processing comprising:

identifying a user;

acquiring attribute information corresponding to the identified user from a first memory which stores attribute information of users in regard to a plurality of users;

acquiring rule information corresponding to a transmission destination of input information and a class of input information from a second memory which stores, in correspondence with transmission destinations of input information and classes of input information, rule information representing rules indicating methods used to generate input information from attribute information of users;

generating the input information corresponding to the identified user by applying the acquired rule to the acquired attribute information; and transmitting the generated input information to the transmission destination, wherein, when attribute information completely matching the input information exists within the attribute information that is read from the first memory and that corresponds to the identified user, a rule designating a category of the completely matching attribute information is generated, and, when attribute information partially matching the input information exists within the attribute information, an editing method for causing the partially matching attribute information to completely match the input information is determined and a rule that designates a category of the partially matching attribute information and the determined editing method is generated.

10. An information input assistance method comprising:

identifying a user;

acquiring attribute information corresponding to the identified user from a first memory which stores attribute information of users in regard to a plurality of users;

acquiring rule information corresponding to a transmission destination of input information and a class of input information from a second memory which stores, in correspondence with transmission destinations of input information and classes of input information, rule information representing rules indicating methods used to generate input information from attribute information of users;

generating the input information corresponding to the identified user by applying the acquired rule to the acquired attribute information; and transmitting the generated input information to the transmission destination, wherein, when attribute information completely matching the input information exists within the attribute information that is read from the first memory and that corresponds to the identified user, a rule designating a category of the completely matching attribute information is generated, and, when attribute information partially matching the input information exists within the attribute information, an editing method for causing the partially matching attribute information to completely match the input information is determined and a rule that designates a category of the partially matching attribute information and the determined editing method is generated.

11. A non-transitory computer-readable medium storing a program for causing a computer to perform information input assistance processing, the processing comprising:

identify a user;

read attribute information corresponding to the identified user from a first memory which stores attribute information for a plurality of users, reads rule information corresponding to a transmission destination of input information and a class of input information from a second memory which stores, in correspondence with transmission destinations of input information and classes of input information, rule information representing rules for generating input information from attribute information of users, and generates the input information corresponding to the identified user on the basis of the acquired attribute information and the acquired rule information;

performs processing that transmits the generated input information to the transmission destination; and when the input information is input by the user, checks the input information against the acquired attribute information that corresponds to the identified user, generates a rule for generating the input information from the attribute information of the user, and causes the second memory to additionally store rule information representing the generated rule in correspondence with the transmission destination of the input information and the class of the input information, wherein, when attribute information completely matching the input information exists within the attribute information that is read from the first memory and that corresponds to the identified user, a rule designating a category of the completely matching attribute information is generated, and, when attribute information partially matching the input information exists within the attribute information, an editing method for causing the partially matching attribute information to completely match the input information is determined and a rule that designates a category of the partially matching attribute information and the determined editing method is generated.

* * * * *